United States Patent [19]

Poulsen

[11] 4,143,774
[45] Mar. 13, 1979

[54] TRUCK FOR INTERNALLY SUPPORTING AND TRANSPORTING PLASTIC PIPE FROM A PIPE MAKING MACHINE

[75] Inventor: Peder U. Poulsen, Fredensborg, Denmark

[73] Assignee: Owens-Corning Fiberglas Corporation, Toledo, Ohio

[21] Appl. No.: 765,473

[22] Filed: Feb. 4, 1977

[51] Int. Cl.$^2$ ............................................. B23Q 1/08
[52] U.S. Cl. ........................................ 414/745; 72/49; 414/757; 414/618; 414/911; 269/48.1; 294/97
[58] Field of Search ............ 214/1 P, 1 PA, 1 D, 214/1 Q, 130 C, DIG. 3, DIG. 4, 651, 340; 156/429; 294/95, 97, 67 C; 269/48.1; 72/49, 50, 142

[56] References Cited

U.S. PATENT DOCUMENTS

| | | | |
|---|---|---|---|
| 1,580,188 | 4/1926 | Wright | 214/3.1 |
| 2,309,730 | 2/1943 | Hastings | 214/DIG. 4 |
| 2,841,300 | 7/1958 | Berquist | 294/97 X |
| 3,007,428 | 11/1961 | Wuesthoff | 214/340 |
| 3,016,856 | 1/1962 | Cummings | 214/1 PA X |
| 3,365,844 | 1/1968 | Olton | 294/97 X |
| 4,039,365 | 8/1977 | Takasuga | 214/DIG. 3 |

FOREIGN PATENT DOCUMENTS 1248887 2/1965 Fed. Rep. of Germany ............. 294/97

Primary Examiner—Albert J. Makay
Assistant Examiner—George F. Abraham
Attorney, Agent, or Firm—Ronald C. Hudgens; Paul J. Rose; Patrick P. Pacella

[57] ABSTRACT

A truck on rails includes a vertically adjustable horizontally extending main beam supported at one end and having a plurality of auxiliary beams semi-circularly arranged thereabout parallel thereto and each connected thereto by a plurality of parallel levers of equal length each having a fulcrum on the main beam, being pivotally connected adjacent an outer end to its respective auxiliary beam, and being operatively connected adjacent an inner end to an actuating rod reciprocable by a hydraulic actuator for adjustment of the auxiliary beams radially of the main beam. The auxiliary beams are provided with rollers for engagement with the inside of a pipe, and those on the uppermost auxiliary beam are driven by a compressed-air motor to compensate for frictional drag imposed by the others on pipe being rotated in continuous production on a pipe making machine. When the pipe is cut to length, the truck transports the cut-off length to a storage or shipping area and returns to support another length being made.

2 Claims, 7 Drawing Figures

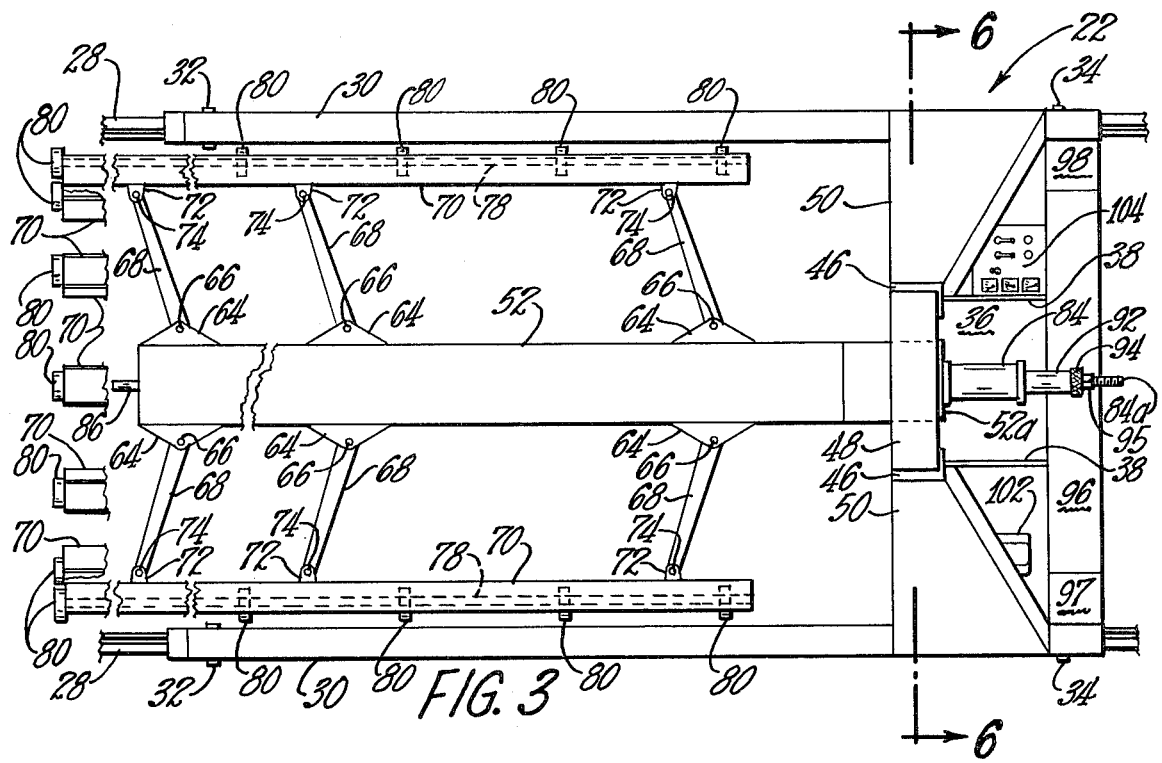
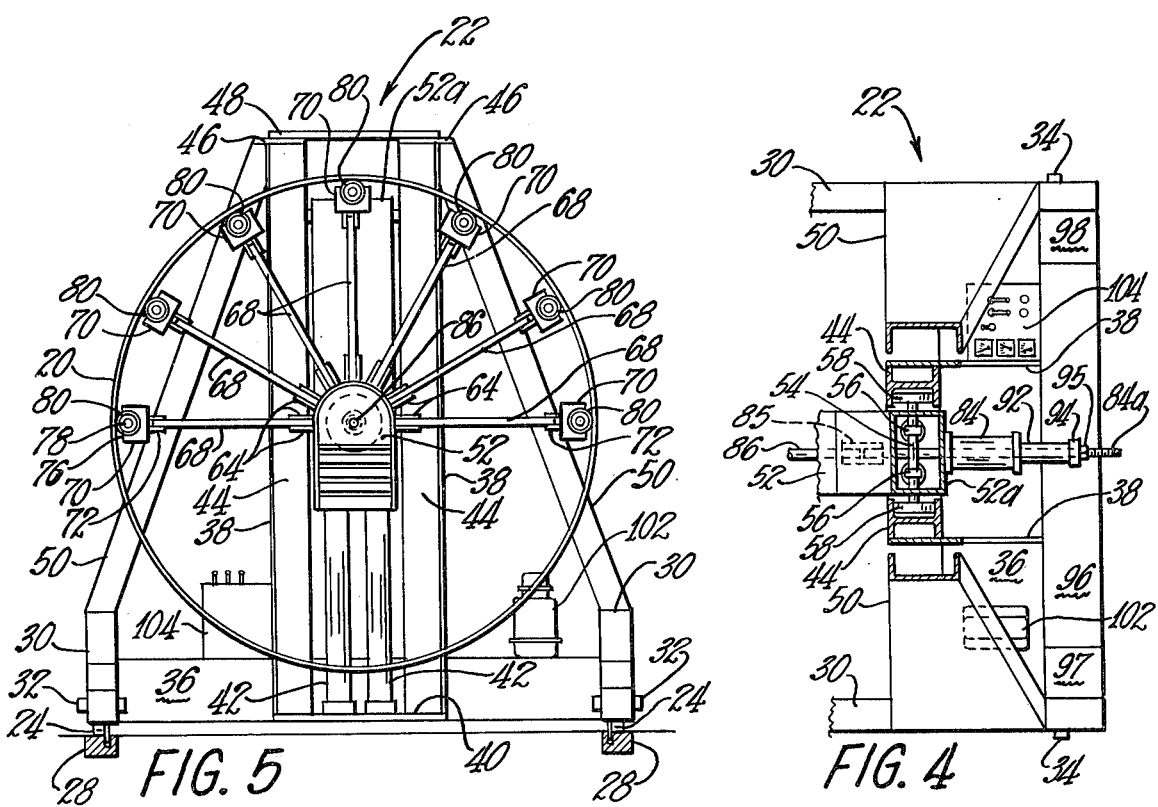

TRUCK FOR INTERNALLY SUPPORTING AND TRANSPORTING PLASTIC PIPE FROM A PIPE MAKING MACHINE

This invention relates generally to continuous process pipe making machines of the type wherein resin and glass fiber reinforcement are deposited on a mandrel surface provided by a continuously recirculating helical band, and more particularly to a truck having means for internally supporting a free end of a pipe as it rotates and progresses off the helical band while being produced, the truck being on rails and being adapted to transport a section of pipe to a storage area after the pipe is cut off from the remainder on the helical band, and the pipe supporting means being readily adjustable to handle pipe of various internal diameters.

An object of the invention is to provide an improved means of supporting the free end of a pipe being produced on a pipe making machine having a continuously recirculating helical band mandrel surface and of transporting the pipe to a storage or shipping area after it is cut to length to free it from the remainder still supported by the mandrel surface.

Another object is to provide a truck mountable on rails extending axially of a continuously recirculating helical band mandrel surface and having adjustable support means for internally supporting pipe of various diameters selectively.

Other objects and advantages will become apparent when the following specification is considered along with the accompanying drawings in which:

FIG. 3 is a plan view of the pipe supporting and transporting means of FIG. 2, with certain other portions broken away;

FIG. 4 is a fragmentary horizontal sectional view taken generally along the line 4—4 of FIG. 2;

FIG. 5 is a front elevational view taken from the left-hand side of FIG. 2;

Figure 1:
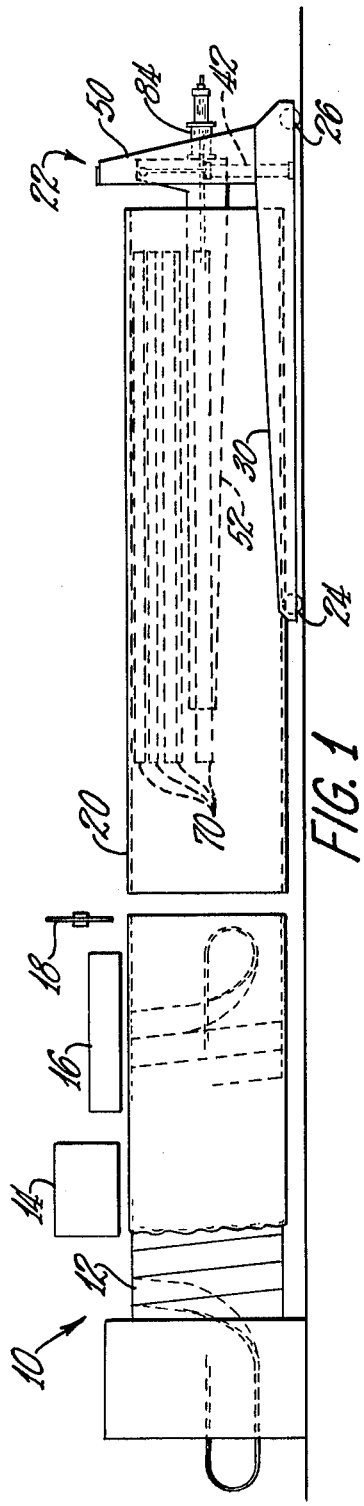
FIG. 1 is a side elevational view of a pipe making machine having pipe supporting and transporting means constructed in accordance with the invention associated therewith.

With respect to the drawings, a pipe making machine 10 generally of the type disclosed in my U.S. Pat. No. 3,679,521, is schematically shown in FIG. 1. The machine 10 includes a rotating cantilevered mandrel surface provided by a continuously recirculating helical band 12, a pipe material applicating station 14 from which hardenable liquid resin, glass fiber reinforcing material, and sometimes a filler such as sand are applied to the mandrel surface, a heating means 16 for accelerating curing of the resin, and a rotatable circular saw 18 movable toward and away from an axial extension of the mandrel surface to cut off a pipe 20.

Figure 6:
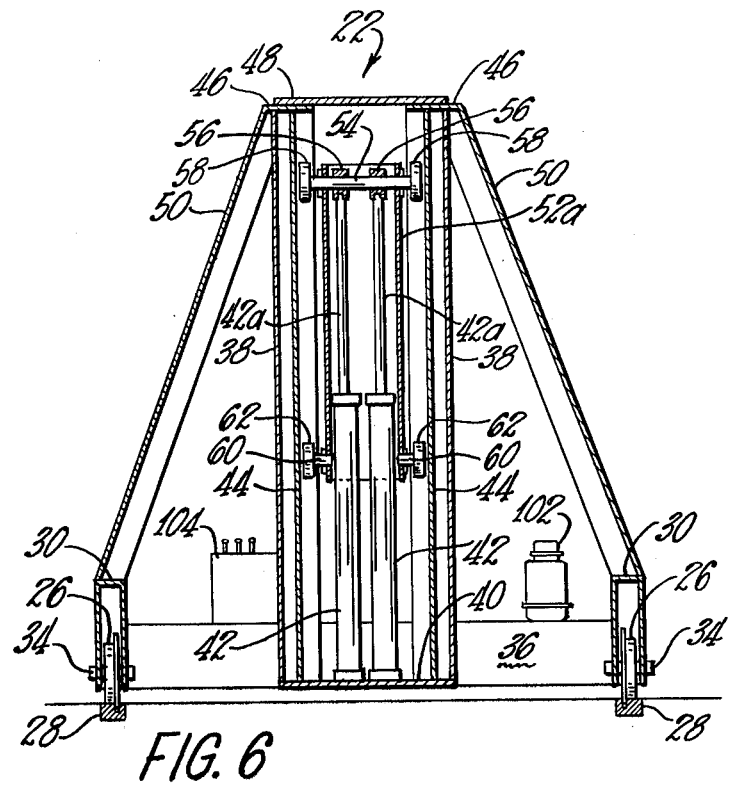
FIG. 6 is a vertical sectional view taken generally along the line 6—6 of FIG. 3, with certain portions omitted.

Shown in association with the machine 10 and pipe 20 is a pipe supporting and transporting truck 22 constructed in accordance with the invention. The truck 22 is more clearly shown by itself in FIGS. 2-7 and includes a pair of front wheels 24 and a pair of rear wheels 26, each of a pair of parallel rails 28, extending axially of the mandrel surface provided by the recirculating helical band 12, having one wheel 24 and one wheel 26 mounted thereon. Each of a pair of parallel generally channel shaped, side frame members 30 extends along a rail 28 and has one wheel 24 rotatably mounted therein on an appropriate shaft 32 and one wheel 26 rotatably mounted therein on an appropriate shaft 34. As best shown in FIG. 3, the side frame members 30 are connected together only at their rear end portions adjacent the rear wheels 26 and shafts 34. A box frame member 36 joins the side frame members 30. A pair of parallel spaced generally triangular support members 38 is mounted on the box frame member 36. As best shown in FIG. 4, the lower portions of the members 38 are wider than the box frame member 36, and as best shown in FIGS. 5 and 6, the front portions of the members 38 overhang the member 36 and extend downwardly along the front thereof to a hydraulic actuator support plate 40 secured thereto adjacent the bottom of the member 36. The lower end portions of cylinders 42 of a pair of adjacent hydraulic acutators are supported on the plate 40 intermediately thereof. Each member 38 has a vertically extending I-beam 44 secured to the front portion of an inner side thereof, as best shown in FIG. 4, the members 38 and their associated I-beams 44 extending from the plate 40 respectively to a pair of cap plates 46 tied together by a larger cap plate 48. Each of a pair of angularly extending oppositely disposed channel-shaped side braces 50 joins a side frame member 30 to an upper portion of a respective one of the support members 38 and its associated cap plate 46. At the bottom each brace 50 is as wide as the sum of the widths of the box frame member 36 and the plate 40, and the rear side of the channel shape tapers toward the front side thereof as it extends upwardly and toward the other brace 50.

A vertically adjustable horizontally extending composite hollow main beam 52 having an upwardly extending leg portion 52a at one end is supported at the leg portion 52a by a pair of piston rods 42a connected respectively to pistons in the cylinders 42 of the hydraulic actuators. As best shown in FIGS. 4 and 6, a shaft 54 extends through upper portions of opposite side walls of the leg portion 52a, which is open at the bottom. The shaft 54 is connected to the piston rods 42a by a pair of fittings 56 and is provided at opposite ends respectively with a pair of wheels or rollers 58 in rolling engagement respectively with the I-beams 44. Lower portions of opposite side walls of the leg portion 52a are provided respectively with a pair of stub axles 60 each having a wheel or roller 62 in rolling engagement with a respective one of the I-beams 44. The wheels 58 engage principally the front flanges of the I-beams 44 and the wheels 62 engage principally the rear flanges of the I-beams 44 to retain the main beam 52 in a horizontal position.

Figure 2:
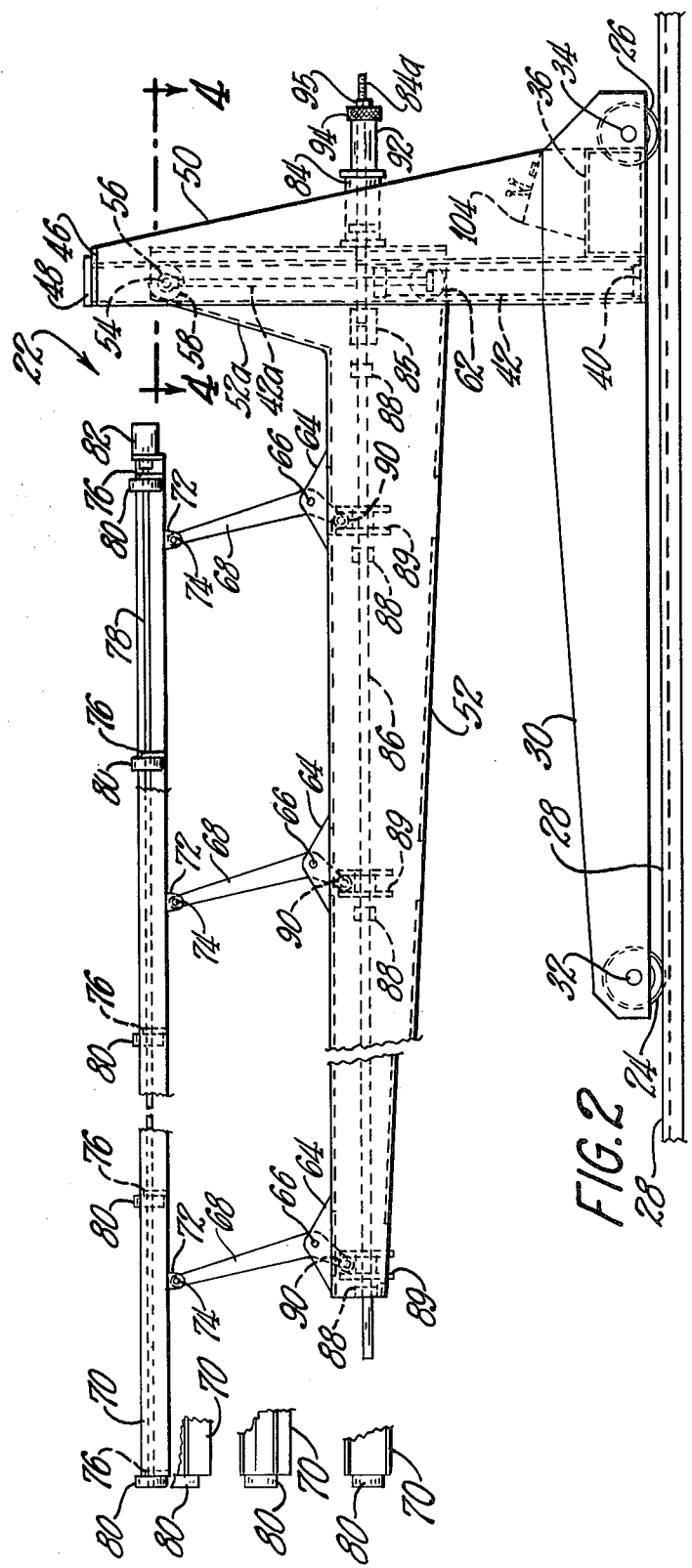
FIG. 2 is an enlarged side elevational view of the pipe supporting and transporting means of FIG. 1, with certain portions broken away.

The upper portion of the main beam 52 is semi-circular while the lower portion is rectangular with sides tapering and reducing in height as they progress toward the free end of the beam. The sloping bottom of the beam 52 is provided with access openings at spaced intervals. At each of several locations spaced along the upper portion of the main beam 52, seven pairs of spaced apart mounting plates 64 are secured thereto in a semi-circular pattern, centered thirty degrees apart (FIGS. 2, 3, and 5). Each pair of mounting plates 64 is provided with a fulcrum pin 66 on which a lever 68 is mounted between the plates. Seven auxiliary beams 70 are arranged in a semi-circular pattern about the main beam 52 and each is pivotally connected to outer end portions of a set of several levers 68, the levers of each set being spaced and aligned axially of the main beam 52 and all the levers 68 being identical in size and shape. The beams 70 are channel-shaped and each is provided with a plurality of clevis members 72 spaced longitudinally along the outside of the bottom of the channel shape and joined to the respective levers 68 respectively by a plurality of pins 74. As shown in FIG. 2, each channel beam 70 is provided with a plurality of bearing blocks 76 spaced longitudinally of the beam for supporting a shaft 78 having a plurality of rollers 80 mounted thereon respectively adjacent the bearing blocks 76. The uppermost auxiliary beam 70, shown in FIG. 2, is provided with an air driven motor 82 for driving the respective shaft 78 and rollers 80 keyed thereto. The rollers 80 of the other auxiliary beams 70 may be rotatably mounted on their shafts 78. The driving of the uppermost rollers 80 by the motor 82 in the same direction as a pipe being made on the machine 10 is rotated compensates for the frictional resistance to rotation in the rollers 80 of the other auxiliary beams 70, whereby the truck 22, in supporting a pipe 20 before it is cut off, places no additional rotational load on the machine 10.

A cylinder 84 of a double-acting hydraulic actuator is mounted on the rear of the upwardly extending leg portion 52a in alignment with the hollow main beam 52 and has a piston rod 84a projecting through opposite end caps thereof. A coupling 85 joins the left-hand end of the piston rod 84a, as viewed in FIG. 2, to a shaft 86 extending through the main beam 52. The shaft 86 is reciprocably mounted in a plurality of spaced bearings 88 suitably supported within the main beam 52. A plurality of doubly flanged collars or spools 89 are fixedly secured to the shaft 86 in spaced relationship therealong. The main beam 52 is slotted at appropriate places to receive the inner ends of all the levers 68. Each lever 68 has a pair of rollers 90 rotatably mounted on an inner end portion thereof respectively on opposite sides. Each spool 89 has the rollers 90 of seven levers 68 trapped between the flanges thereof. A sleeve 92 on the cylinder 84 acts as a stop for a knurled nut 94 threadedly mounted on the right-hand end portion of the piston rod 84a, as viewed in FIG. 2, and held in an adjusted position with respect thereto by a lock nut 95.

At the rear of the box frame member 36 a step or standing platform 96 is provided. The platform 96 extends transversely between a pair of box-like structures 97 and 98 respectively adjacent the side frame members 30. A rear side of the structure 97 is omitted in FIG. 7 to show an electric motor 100 operatively connected to the left rear wheel 26 for driving the truck 22 along the rails 28.

Figure 7:
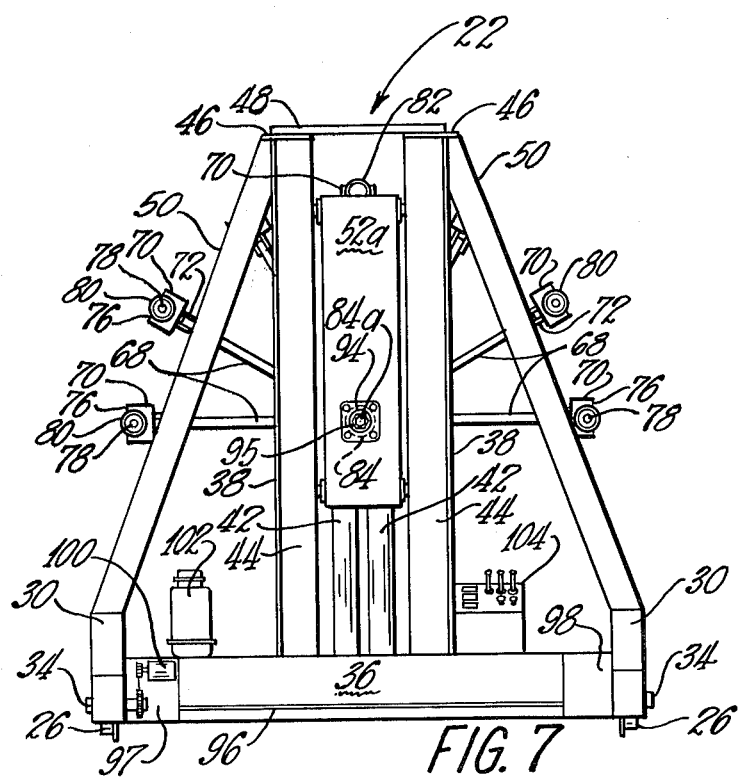
FIG. 7 is a rear elevational view taken from the right-hand side of FIG. 2.

A power unit 102, which may be an internal combustion engine operatively connected to a generator and to a hydraulic pump, is schematically shown adjacent the left-hand end of the box frame member 36 as viewed in FIG. 7, and a control box 104 is shown adjacent the right-hand end.

Operation

As a pipe 20 being formed progresses off the helical band 12, the truck 22 is driven forward to insert the front end portions of the auxiliary beams 70 into the pipe while the auxiliary beams are contracted radially with respect to the semi-cylindrical portion of the main beam 52 and the shaft 86. The piston in the cylinder 84 is then moved by hydraulic fluid to the left as viewed in FIG. 2, moving the piston rod 84a, coupling 85, shaft 86, spools 89, rollers 90, and the inner end portions of all the levers 68 to the left until the nut 94 engages the sleeve 92 to limit expansion of the auxiliary beams 70 radially with respect to the semi-cylindrical portion of the main beam 52. The nut 94 would previously have been adjusted for the internal pipe diameter so that the rollers 80 contact the inner surface of the pipe as the nut 94 engages the sleeve 92. The pipe 20 is rotating as it is being formed on the recirculating helical band 12, and to prevent the rollers 80 from exerting excessive frictional drag on the pipe 20 and the machine 10, the rollers 80 on the uppermost beam 70 are driven by the motor 82 in the same direction as the pipe rotates. As the pipe 20 continues being formed and progressing off the helical band 12, it will move along the beams 70 and engage successive sets of the rollers 80, so that the free end thereof with respect to the machine 10 will always be supported. As the leading end of the pipe approaches the side braces 50 of the truck 22, the saw 18 is operated to cut the pipe to a planned section length and the motor 82 is shut off. The truck 22 is then backed away from the machine 10 carrying the cut-off section of pipe 20. Normally the truck 22 is backed out of a building housing the machine 10 and the hydraulic fluid pressure in the cylinders 42 is then released to lower the main beam 52 as the wheels 58 and 62 roll along the I-beams 44 until the pipe 20 contacts the ground between the rails 28 and side frame members 30, the frame members 30 being connected only at their rear end portions by the box frame member 36 to provide clearance for lowering of the pipe 20. The piston in the cylinder 84 is then moved by hydraulic fluid to the right as viewed in FIG. 2, moving the piston rod 84a, coupling 85, shaft 86, spools 89, rollers 90, and inner end portions of the levers 68 to the right and contracting the auxiliary beams 70 radially with respect to the upper semi-cylindrical portion of the main beam 52 and the shaft 86. The truck 22 is then backed until the beams 70 are completely out of the pipe 20, which may then be rolled away for storage or shipment. Once the pipe 20 is out of the way, the main beam 52 is raised back to the proper height by hydraulic fluid pressure in the cylinders 42, the truck 22 is driven forward to insert the front end portions of the beams 70 into a new pipe section 20 being formed, and the piston in the cylinder 84 is moved to the left again to expand the beams 70 radially of the semi-cylindrical portion of the main beam 52, and the motor 82 is started.

Various modifications may be made in the structure shown and described without departing from the spirit and scope of the invention as set forth in the appended claims.

I claim:

1. For receiving and supporting glass fiber reinforced thermosetting resin pipe being continuously produced by a pipe making machine and for transporting cut-off pipe segments away from the machine along a pair of floor-mounted rails extending parallel to and disposed on opposite sides equal distances from the longitudinal axis of pipe being formed, a truck comprising a pair of spaced elongated generally parallel side frame members each having a front wheel and a rear wheel rotatably mounted thereon, the wheels of each side frame member normally being mounted on a respective one of said rails, an upstanding framework connecting said side frame members together solely adjacent rear end portions thereof, a horizontally extending elongated main beam supported solely adjacent one end on said framework and extending forwardly therefrom with the longitudinal axis lying in a vertical plane which is between and parallel to said side frame members, several elongated auxiliary beams parallel to said main beam and arranged in a semicircular pattern thereabout above and on opposite sides thereof, each of said auxiliary beams having a set of several rollers mounted thereon for rotation about a common axis parallel to the beam, the rollers being spaced from each other longitudinally of the beam and projecting outwardly therefrom for engagement with the inside of a pipe segment, the auxiliary beams with their rollers being adapted to support a pipe segment by engagement with the inside of the pipe segment substantially only on an upper half thereof, several sets of parallel levers of equal length, there being several levers in each set and the levers of each set being spaced from each other longitudinally of the beams, each of said auxiliary beams being connected to the main beam by one of said sets of parallel levers, each of said levers having a fulcrum on said main beam, being pivotally connected adjacent an outer end on one side of its fulcrum to its respective auxiliary beam, and having an inner end portion on the other side of its fulcrum, an axially reciprocable horizontal actuating shaft operatively connected to the inner end portions of all of said levers for expanding and contracting the auxiliary beams radially with respect to the main beam, means on said main beam operatively connected to said horizontal actuating shaft for axially reciprocating the shaft, and means on said framework operatively connected to said main beam for vertically adjusting the main beam.

2. A truck as claimed in claim 1 including means on an uppermost one of said auxiliary beams for rotatably driving the rollers thereof.

* * * * *